United States Patent [19]
Kato et al.

[11] Patent Number: 5,077,120
[45] Date of Patent: * Dec. 31, 1991

[54] OPTICAL DISK

[75] Inventors: Hiroshi Kato, Saitama; Masataka Uchidoi; Masaomi Ebe, both of Yamanashi, all of Japan

[73] Assignee: Pioneer Electronic Corporation, Tokyo, Japan

[*] Notice: The portion of the term of this patent subsequent to Mar. 5, 2002 has been disclaimed.

[21] Appl. No.: 596,629

[22] Filed: Oct. 9, 1990

Related U.S. Application Data

[63] Continuation of Ser. No. 5,308, Jan. 20, 1987, abandoned, which is a continuation of Ser. No. 778,739, Sep. 23, 1985, abandoned, which is a continuation of Ser. No. 394,249, Jul. 1, 1982, abandoned.

[30] Foreign Application Priority Data

Jul. 1, 1981 [JP] Japan ................. 56-102467

[51] Int. Cl.$^5$ ............................. G11B 7/24
[52] U.S. Cl. ..................... 428/200; 428/344; 428/346; 428/347; 428/349; 369/275.1; 369/275.5; 369/283; 369/284; 369/286; 358/342; 427/162; 427/164; 427/428
[58] Field of Search ............ 427/428, 162, 164; 369/283, 286, 275.5, 275.1, 284; 428/344, 346, 349, 200, 347; 358/342

[56] References Cited

U.S. PATENT DOCUMENTS

| | | | |
|---|---|---|---|
| 3,663,265 | 5/1972 | Lee | 427/41 |
| 4,004,080 | 1/1977 | Vossen | 369/283 |
| 4,020,278 | 4/1977 | Carré | 369/283 |
| 4,037,251 | 7/1977 | Bricot | 369/283 |
| 4,268,575 | 5/1981 | Shinuzaki | 369/283 |
| 4,310,919 | 1/1982 | Slaten | 369/286 |
| 4,363,844 | 12/1982 | Lewis | 369/283 |
| 4,503,531 | 3/1985 | Kato | 369/286 |
| 4,583,102 | 4/1986 | Tamura | 427/162 |

OTHER PUBLICATIONS

Booth, *Coating Equipment and Processes*, (Lockwood, N.Y.) c. 1970, pp. 49-53.

Primary Examiner—Michael Lusignan
Assistant Examiner—Margaret Burke
Attorney, Agent, or Firm—Sughrue, Mion, Zinn, Macpeak & Seas

[57]     ABSTRACT

An optical disk is provided with a protective layer which is an adhesive which is non-tacky at room temperature in the case of a one sided disk; and which is useful as a tacky adhesive at room temperature in the case of a two sided disk made from two one-sided disks bonded to one another.

14 Claims, 1 Drawing Sheet

OPTICAL DISK

This is a continuation of application Ser. No. 07/005,308 filed Jan. 20, 1987, which is a continuation of application Ser. No. 778,739, filed Sept. 23, 1985, which is a continuation of application Ser. No. 394,249 filed July 1, 1982, all are abandoned.

BACKGROUND OF THE INVENTION

This invention relates to an improvement in optical video disks or digital audio disks.

An optical video disk is fabricated according to the following method: As shown in FIG. 1, signal pits $1a$ are formed in one side of a layer 1 of synthetic resin such as acrylic resin, and a reflecting film 2 of aluminum or the like is formed on the side of the layer 1 thus treated. A protective film 3 is formed on the reflecting film 2, to form one disk. Another disk is prepared according to the same method. Then, the protective films 3 and 3' are bonded to each other with an adhesive. In FIG. 1, like parts are designated by like reference numerals, but with primes added.

Heretofore, a solvent type adhesive has been employed to bond the protective films to one another. Therefore, the solvent type adhesive must be such as will not affect the synthetic resin and the reflecting surfaces. Thus, the selection of a suitable adhesive is considerably difficult. Furthermore, as the adhesive is liable to flow to the surfaces of the synthetic resin layers, the resultant product is often low in practical worth. On the other hand, as the adhesive is dried after being applied to bond the two disks, dust may stick to the adhesive during the drying operation, thus spoiling the product; that is, with such a product, noise is produced during reproduction.

SUMMARY OF THE INVENTION

In view of the foregoing, an object of this invention is to provide an optical disk in which the disks are bonded together with a hot-melt type adhesive, whereby the disk material and the reflecting films are not adversely affected. The resultant product is improved in quality, and not only the manufacturing procedure can be simplified, but the cost of the required equipment can be reduced.

DETAILED DESCRIPTION OF THE PREFERRED EMBODIMENTS

A method of manufacturing an optical disk according to this invention will be described with reference to FIG. 2.

Figure 1:
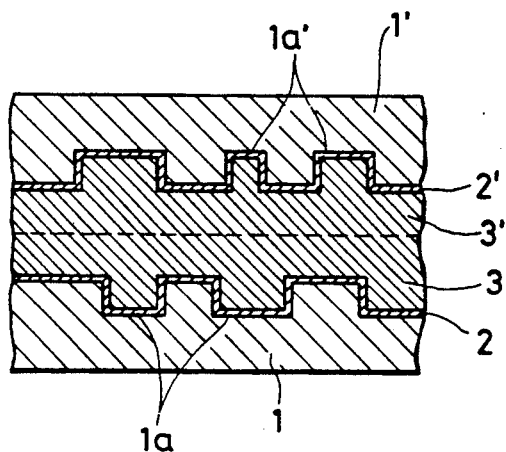
FIG. 1 is a sectional view of an optical disk.
Figure 2A:
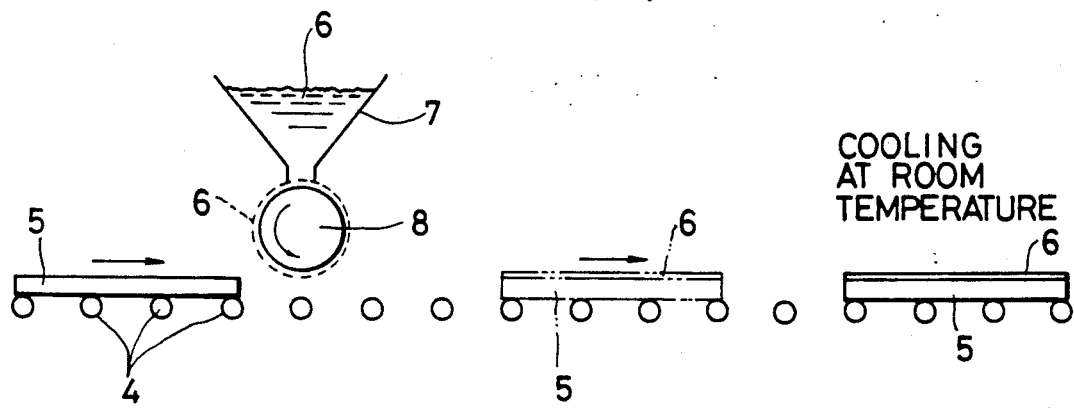
FIGS. 2a and 2b are explanatory diagram showing steps in the manufacture of optical disks according to the invention.
Figure 2B:
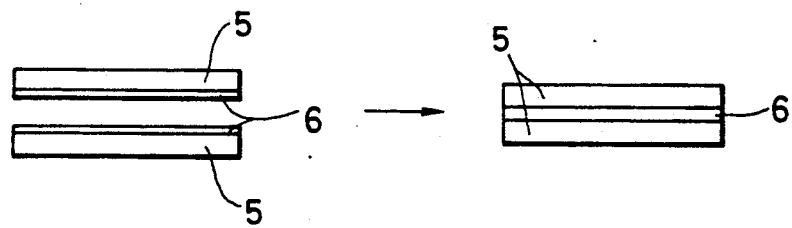

In FIG. 2, reference numeral 4 designates a roller conveyor for conveying a disk 5 in the direction of the arrow, which disk has been prepared by forming signal pits on a blank of synthetic resin such as acrylic resin and by forming a reflecting film of aluminum or the like on the disk thus treated. Reference numeral 6 designates a hot melt type filming agent. For the disk 5, only one side of which is reproduceable, the filming agent is such that, the tacky adhesion thereof is smaller than 4 kg 1 inch at a temperature of, 95° C., and the surface tack is less than that of EVA resin at room temperature (that is, not tacky at room temperature). For instance, "062" adhesive made by Sela Tilney Japan Ltd. is suitable for the disk 5 mentioned above. The composition of "062" adhesive is as follows:

| | weight percent |
| --- | --- |
| Ethylene/vinyl acetate copolymer | approximately 40% |
| Microcrystalline wax | approximately 30% |
| Petroleum resin | approximately 30% |

Where two disks 5 are to be bonded together so that signals can be reproduced from both sides thereof, a suitable filming agent is such that the tacky adhesion thereof is smaller than 4 kg at a temperature of 95° C., and it is useful as a tacky adhesive at room temperature. (For instance, "HM406" adhesive made by Cemedine Co., Ltd. is employable). The composition of "HM 406" is as follows:

| | approximate weight proportion | |
| --- | --- | --- |
| Styrene/isoprene block polymer | (0 to 100) | |
| Styrene/butadiene block polymer | (0 to 100) | 100 as a mixture |
| Styrene/ethylene/butadiene block polymer | (0 to 100) | |
| Mineral oil | 0 to 100 | |
| Hydrogenated petroleum resin | 100 to 600 | |

The mineral oil operates as a plasticizer and the petroleum resin operates as a tackifier.

Further in FIG. 2, reference numeral 7 designates a hopper into which the aforementioned hot-melt type filming agent 6 is poured, the hopper operating to heat and melt the filming agent 6 and apply the filming agent thus heated to the surface of a roll coater 8. More specifically, the roll coater 8 operates to apply the filming agent 6 onto the reflecting surface side of the disk 5 which is being conveyed on the roller conveyor 4. The roll coater 8 is turned in the direction of the advancement of the disk 5 and is coated with the filming agent 6 by the hopper 7.

As the disk 5 is conveyed by the roller conveyor 4, the hot-melt type filming agent 6 is thus applied to the reflecting surface side of the disk 5 when the latter passes through the roll coater 8.

In the case of a single-sided disk, the filming agent 6 thus coated is solidified by being cooled to room temperature while the disk is further conveyed. Thus, the filming agent thus solidified serves as a protective film for the reflecting layer of the disk.

On the other hand, with the two sided disk, two disks, to at least one of which the filming agent 6 has been applied, are prepared. The two disks are then bonded to one another using the filming agent 6 as the adhesive, to thus form one unit, namely, a two-sided disk. It goes without saying that disks formed with the aforementioned adhesive "062" used as protective films thereon may be bonded together using the above-described adhesive "HM406".

As is apparent from the above description, according to the invention, two disks are bonded together with a hot-melt type adhesive. Accordingly, in the optical disk of the invention, the influence of dust motes or the like on reproduction is eliminated; that is, the quality of the disk is remarkably improved. Further, in the optical disk of the invention, the flow of the adhesive to the disk surface during manufacture can be minimized, i.e., the effect of the flow of the adhesive on the resultant quality is minimized; and the manufacturing equipment and process can be simplified and costs correspondingly reduced.

What is claimed is:

1. A method of manufacturing an optical disk, comprising the steps of:
   preparing a synthetic resin disk substrate having signal pits formed on one surface thereof,
   forming a reflecting film layer over said signal pits,
   conveying said disk substrate,
   heating a hot-melt type filming agent,
   coating said heated and melted hot-melt type filming agent on said reflecting film layer,
   solidifying said filming agent coated on said reflecting film layer to form a protective coating for said reflecting film layer, wherein said hot-melt type filming agent is not a solvent-type adhesive that affects and erodes said synthetic resin disk substrate, and
   bonding two said disk substrates with an adhesive material after said solidifying of said filming agent, wherein said adhesive material comprises a hot-melt type filming agent which is not a solvent-type adhesive that affects and erodes the synthetic resin disk substrate and which maintains its adhesive properties at room temperature,
   wherein said adhesive material has a composition comprising the following components in the following approximate weight proportions:

|  | Approximate weight proportion |
|---|---|
| Block polymer | 100 |
| Plasticizer | 0 to 100 |
| Tackifier | 100 to 600. |

2. A method of manufacturing an optical disk as claimed in claim 1, wherein said filming agent is coated on said reflecting film layer by a roll coater.

3. A method of manufacturing an optical disk as claimed in claim 1 or 2, wherein said adhesive material has a composition comprising the following components in the following approximate weight proportions:

|  | Approximate weight proportion |  |
|---|---|---|
| Styrene/isoprene block polymer | (0 to 100) | ⎫ |
| Styrene/butadiene block polymer | (0 to 100) | ⎬ 100 as a mixture |
| Styrene/ethylene/butadiene block polymer | (0 to 100) | ⎭ |
| Mineral oil | 0 to 100 |  |
| Hydrogenated petroleum resin | 100 to 600. |  |

4. A method of manufacturing an optical disk, comprising the steps of:
   preparing a synthetic resin disk substrate having signal pits formed on one surface thereof,
   forming a reflecting film layer over said signal pits,
   conveying said disk substrate,
   heating a hot-melt type filming agent,
   coating said heated and melted hot-melt type filming agent on said reflecting film layer,
   bonding two said disk substrates through said filming agent, and
   solidifying said filming agent to thereby form two protective coatings bonded together wherein said hot-melt type filming agent is an adhesive material which is not a solvent-type adhesive that affects and erodes the synthetic resin disk substrate and which maintains its adhesive properties at room temperature,
   wherein said adhesive material has a composition comprising the following components in the following approximate weight proportions:

|  | Approximate weight proportion |
|---|---|
| Block polymer | 100 |
| Plasticizer | 0 to 100 |
| Tackifier | 100 to 600. |

5. A method of manufacturing an optical disk as claimed in claim 4, wherein said adhesive material is coated on said reflecting film layer by a roll coater.

6. A method of manufacturing an optical disk as claimed in claim 4 or 5, wherein said adhesive material has a composition comprising the following components in the following approximate weight proportions:

|  | Approximate weight proportion |  |
|---|---|---|
| Styrene/isoprene block polymer | (0 to 100) | ⎫ |
| Styrene/butadiene block polymer | (0 to 100) | ⎬ 100 as a mixture |
| Styrene/ethylene/butadiene block polymer | (0 to 100) | ⎭ |
| Mineral oil | 0 to 100 |  |
| Hydrogenated petroleum resin | 100 to 600. |  |

7. A method of manufacturing an optical disk, comprising the steps of:
   preparing a synthetic resin disk substrate having signal pits formed on one surface thereof,
   forming a reflecting film layer over said signal pits,
   coating a first adhesive material on said reflecting film layer by a roll coater,
   solidifying said first adhesive material coated on said reflecting film layer to form a protective coating for said reflecting film layer, wherein said first adhesive material is a hot-melt type filming agent which is not a solvent-type adhesive that affects and erodes said synthetic disk substrate, and
   bonding two said disk substrates having said protective coating with a second adhesive material, said second adhesive material comprising a hot-melt type filming agent which is not a solvent-type adhesive that affects and erodes the synthetic resin disk substrate and which maintains its adhesive properties at room temperature,
   wherein said second adhesive material has a composition comprising the following components in the following approximate weight proportions:

|  | Approximate weight proportion |
|---|---|
| Block polymer | 100 |
| Plasticizer | 0 to 100 |
| Tackifier | 100 to 600. |

8. A method of manufacturing an optical disk as claimed in claim 7, wherein said first adhesive maintains its adhesive properties at room temperature.

9. A method of manufacturing an optical disk as claimed in claim 7, wherein said first adhesive does not maintain its adhesive properties at room temperature.

10. A method of manufacturing an optical disk as claimed in claim 7, 8 or 9, wherein said adhesive material has a composition comprising the following components in the following approximate weight proportions:

|  | Approximate weight proportion | |
| --- | --- | --- |
| Styrene/isoprene block polymer | (0 to 100) | |
| Styrene/butadiene block polymer | (0 to 100) | 100 as a mixture |
| Styrene/ethylene/butadiene block polymer | (0 to 100) | |
| Mineral oil | 0 to 100 | |
| Hydrogenated petroleum resin | 100 to 600. | |

11. An optical disk comprising:
a first disk-shaped substrate formed of a synthetic resin and having an information bearing surface on which signal pits are formed,
a second disk-shaped substrate formed of a synthetic resin and having an information bearing surface on which signal pits are formed,
a reflective layer overlying the information bearing surface of each of said first and second disk-shaped substrates,
a protective coating overlying each of said reflective layers,
said protective coatings comprising a solidified hot-melt type filming agent which is not a solvent-type adhesive that affects and erodes said synthetic resin disk substrates and which maintains adhesive properties at room temperature, and
means for joining together said protective layers in a facing adjacent relationship, wherein said joining means is adhesive material comprising a solidified hot-melt type filming agent which is not a solvent type adhesive which affects and erodes said synthetic resin disk substrates, and which maintains adhesive properties at room temperature,
wherein said adhesive material has a composition comprising the following components in the following approximate weight proportions:

|  | Approximate weight proportion |
| --- | --- |
| Block polymer | 100 |
| Plasticizer | 0 to 100 |
| Tackifier | 100 to 600. |

12. An optical disk as claimed in claim 11, wherein said adhesive material has a composition comprising the following components in the following approximate weight proportions:

|  | Approximate weight proportion | |
| --- | --- | --- |
| Styrene/isoprene block polymer | (0 to 100) | |
| Styrene/butadiene block polymer | (0 to 100) | 100 as a mixture |
| Styrene/ethylene/butadiene block polymer | (0 to 100) | |
| Mineral oil | 0 to 100 | |
| Hydrogenated petroleum resin | 100 to 600. | |

13. An optical disk comprising:
a first disk-shaped substrate formed of a synthetic resin and having an information bearing surface on which signal pits are formed,
a second disk-shaped substrate formed of a synthetic resin and having an information bearing surface on which signal pits are formed,
a reflective layer overlaying the information bearing surface of each of said first and second disk-shaped substrates,
a protective coating overlying each of said reflective layers,
said protective coatings comprising a solidified hot-melt type filming agent which is not a solvent-type adhesive that affects and erodes said synthetic resin disk substrates, and which does not maintain adhesive properties at a room temperature, and
means for joining together said protective layers in a facing adjacent relationship, said joining means comprising an adhesive material comprising a solidified hot-melt type filming agent which is not a solvent-type adhesive that affects and erodes the synthetic resin disk substrates and which maintains adhesive properties at room temperature,
wherein said adhesive material has a composition comprising the following components in the following approximate weight proportions:

|  | Approximate weight proportion |
| --- | --- |
| Block polymer | 100 |
| Plasticizer | 0 to 100 |
| Tackifier | 100 to 600. |

14. An optical disk as claimed in claim 13, wherein said adhesive material has a composition comprising the following components in the following approximate weight proportions:

|  | Approximate weight proportion | |
| --- | --- | --- |
| Styrene/isoprene block polymer | (0 to 100) | |
| Styrene/butadiene block polymer | (0 to 100) | 100 as a mixture |
| Styrene/ethylene/butadiene block polymer | (0 to 100) | |
| Mineral oil | 0 to 100 | |
| Hydrogenated petroleum resin | 100 to 600. | |

* * * * *